(12) United States Patent
Keigo

(10) Patent No.: US 9,327,201 B2
(45) Date of Patent: May 3, 2016

(54) GAMING MACHINE AND SERVER WITH BONUS SELECTION GAME

(71) Applicant: NHN Entertainment Corporation, Seongnam-si (KR)

(72) Inventor: Tsuya Keigo, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 0 days.

(21) Appl. No.: 14/254,381

(22) Filed: Apr. 16, 2014

(65) Prior Publication Data

US 2014/0315645 A1    Oct. 23, 2014

(30) Foreign Application Priority Data

Apr. 17, 2013    (JP) .................................. 2013-086672

(51) Int. Cl.
*A63F 9/24*    (2006.01)
*A63F 13/70*    (2014.01)
*A63F 13/46*    (2014.01)

(52) U.S. Cl.
CPC ................. *A63F 13/70* (2014.09); *A63F 13/46* (2014.09); *A63F 2300/206* (2013.01)

(58) Field of Classification Search
CPC ..... G07F 17/3272; A63F 13/00; A63F 13/10; A63F 13/12; A63F 13/822; A63F 13/70
See application file for complete search history.

(56) References Cited

U.S. PATENT DOCUMENTS

2004/0242306 A1* 12/2004 Tarantino .................. 463/16
2009/0093291 A1*  4/2009 Gomez ...................... 463/16

FOREIGN PATENT DOCUMENTS

JP    2012-170509    9/2012

* cited by examiner

*Primary Examiner* — Steve Rowland
(74) *Attorney, Agent, or Firm* — H.C. Park & Associates, PLC

(57) ABSTRACT

A server device is configured to display a game screen on a user terminal used by a user. The server device includes an item manager configured to manage points of an item obtained by the user for use in the game, and a game processor configured to calculate a first total value of points of an item selected by the user via the user terminal, to calculate a second total value of points of an item for increasing the first total value, and to increase the first total value according to the second total value.

12 Claims, 8 Drawing Sheets

FIG. 5

| Total Value | Increase Ratio (%) |
|---|---|
| 150 | 1000 |
| 125 | 600 |
| 100 | 400 |
| 75 | 200 |
| 50 | 100 |
| 25 | 50 |
| 0 | 0 |

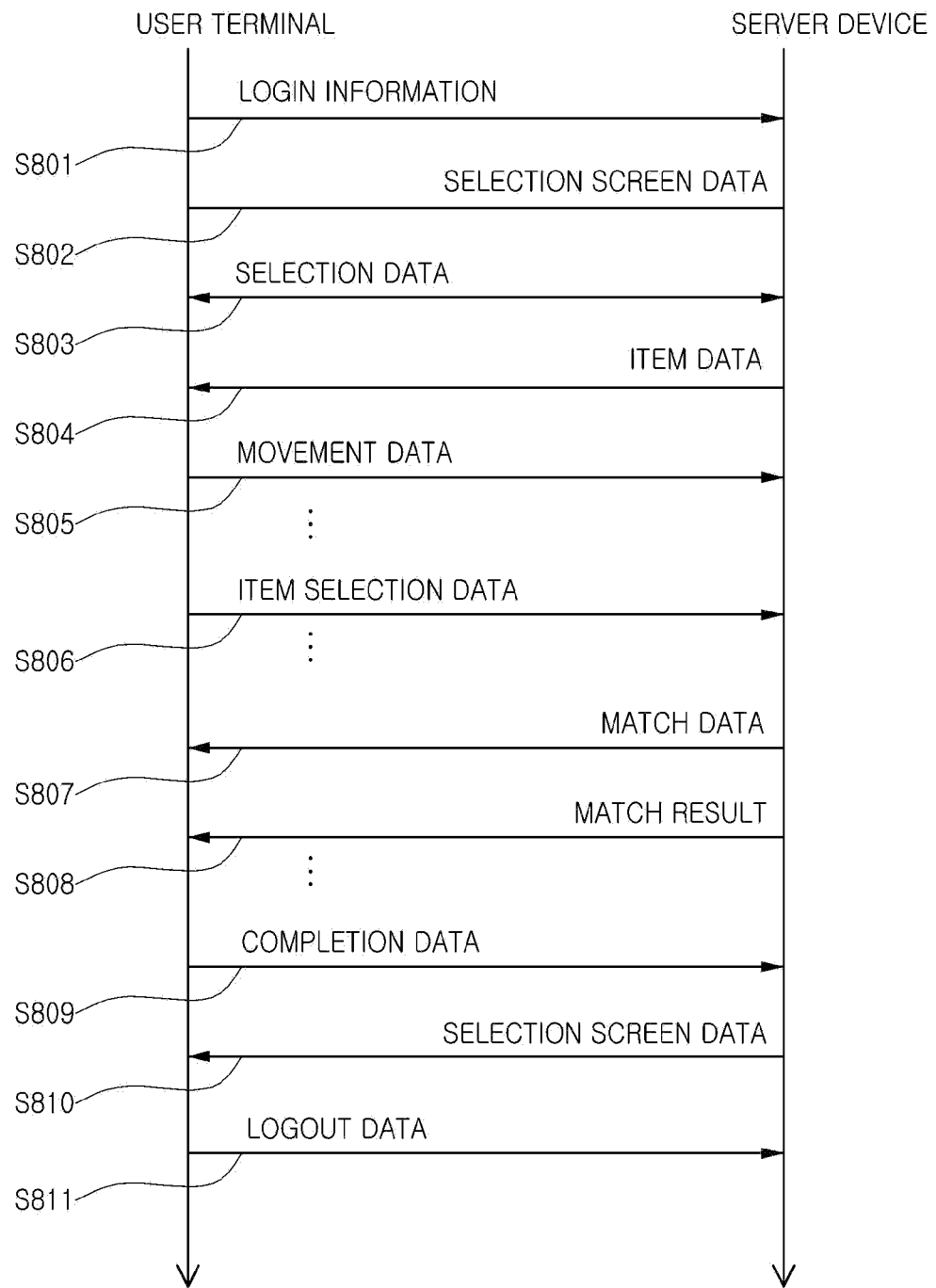

GAMING MACHINE AND SERVER WITH BONUS SELECTION GAME

CROSS REFERENCE TO RELATED APPLICATION

This application claims priority from and the benefit of Japanese Patent Application No. 2013-086672, filed on Apr. 17, 2013, which is hereby incorporated by reference for all purposes as if fully set forth herein.

BACKGROUND

1. Field

Exemplary embodiments of the present disclosure are related to a game server device, a game program, a computer-readable medium containing instructions to execute the game program, and an operation method of the game server device.

2. Discussion of the Background

In a game system, game terminals may be connected to a game server device via a network and users (game players) of the game terminals can compete at various levels of a game.

In some games, such as card games, it may be difficult to retain the user's attention or to provide incentives for the user to keep playing the game. Accordingly, there is a need to provide games, such as card games, in which a game's performance may be enhanced and the user's interest is maintained.

The above information disclosed in this Background section is provided to enhance understanding of the background of the disclosed subject matter and therefore may contain information that does not form any part of the prior art nor what the prior art may suggest to a person of ordinary skill in the art.

SUMMARY

Exemplary embodiments of the present disclosure provide a game system that can maintain the desire of a user for obtaining a new item, such as an additional card.

Additional features of the present disclosure will be set forth in the description which follows, and in part will be apparent from the description, or may be learned by practice of the disclosed subject matter.

Exemplary embodiments of the present disclosure disclose a server device including an item manager and a processor. The item manager manages points associated with at least one user-obtained item. The processor determines a first total value of points of the at least one user-obtained item, determines a second total value of points for increasing the first total value, increases the first total value according to the second total value, and determines a winner of a game based at least on the increased first total value.

Exemplary embodiments of the present disclosure also disclose a method. The method includes determining, by a processor, a first total value of points of at least one user-obtained item, determining a second total value of points, increasing the first total value according to the second total value, and determining a winner of a game based at least on the increased first total value.

Exemplary embodiments of the present disclosure also disclose one or more non-transitory computer-readable storage media having stored thereon a computer program that, when executed by at least one processor, causes the at least one processor to determine a first total value of points of at least one user-obtained item, determine a second total value of points, increase the first total value according to the second total value, and determine a winner of a game based at least on the increased first total value.

It is to be understood that both the foregoing general description and the following detailed description are exemplary and explanatory and are intended to provide further explanation of the disclosed subject matter as claimed

BRIEF DESCRIPTION OF THE DRAWINGS

The accompanying drawings, which are included to provide a further understanding of the disclosed subject matter and are incorporated in and constitute a part of this specification, illustrate embodiments of the disclosed subject matter, and together with the description serve to explain the principles of the disclosed subject matter.

FIG. 5 is an example of a table which stores increase ratios of the total value of points in a game system according to exemplary embodiments of the present disclosure.

FIG. 8 is a sequence diagram of illustrating communications between a user terminal and a server device in a game method and system according to exemplary embodiments of the present disclosure.

DETAILED DESCRIPTION OF THE ILLUSTRATED EMBODIMENTS

Figure 1:
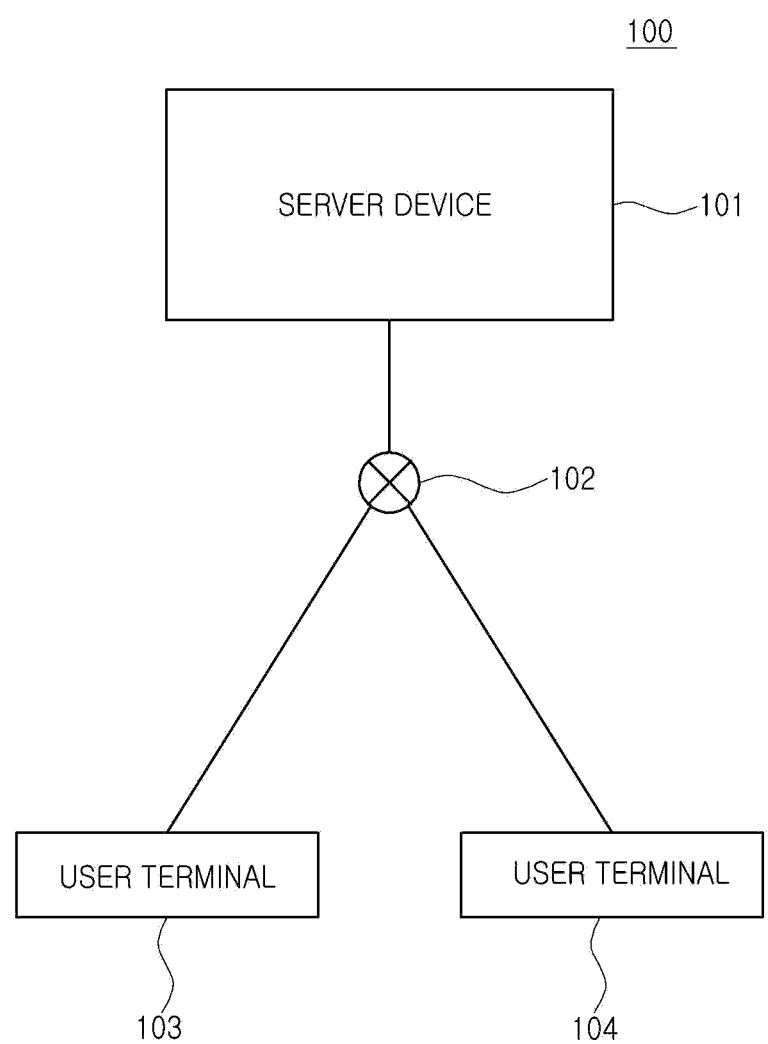
FIG. 1 is a functional block diagram of a game system according to exemplary embodiments of the present disclosure.

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, third etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of the present disclosure.

The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the disclosed subject matter are described herein with reference to cross-section illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing.

Hereinafter, exemplary embodiments of the disclosed subject matter will be described in detail with reference to the accompanying drawings.

FIG. 1 is a functional block diagram of a game system 100 according to exemplary embodiments of the present disclosure. The game system 100 includes a server device 101 and user terminals 103 and 104, which can communicate with the server device 101 via a network 102.

The server device 101 may perform various functions such as providing communications between the network 102 and a terminal 103/104 connected to the network 102. In general, the server device 101 may be any combination of hardware, such as dedicated Large Scale Integration (LSI) circuits. A more detailed description of the server device 101 is provided below with reference to FIGS. 7A and 7B.

The network 102 may be a public line network, such as the Internet, or a specific user-orientated line network, such as an Intranet within a specific organization (e.g., company). The network 102 may also be a fixed-line network or a wireless network such as networks used for mobile terminals.

User terminals 103 and 104 may be, for example, personal computers, game terminals, and mobile phones. In general, user terminals 103 and 104 may be any electronic device capable of connecting in a wireless or wired manner with network 102. It should therefore be understood that the user terminal 103 and 104 may include various components, such as a memory, a transceiver, a processor, and an input/output unit. Browsers may be installed in the user terminals 103 and 104 to execute a game provided by the server device 101 to each of the user terminals 103 and 104. In some cases, an application program for executing a game can be operated after installation of the application program in each of the user terminals 103 and 104. The game provided by the server device 101 may be executed in each of the user terminals 103 and 104 by performing communication between the server device 101 and the application program in the user terminals 103/104. Execution of the game provided by the server device 101 may include performing various functions of the game and displaying one or more screens of the game.

Although only one server device 101 is shown in FIG. 1, in some cases, a plurality of server devices may be arranged. In such cases, it is possible to disperse functions and network load across the plurality of server devices. In addition, although only two user terminals 103 and 104 are shown, the number of user terminals may vary and may be any number greater than 1.

Figure 2:
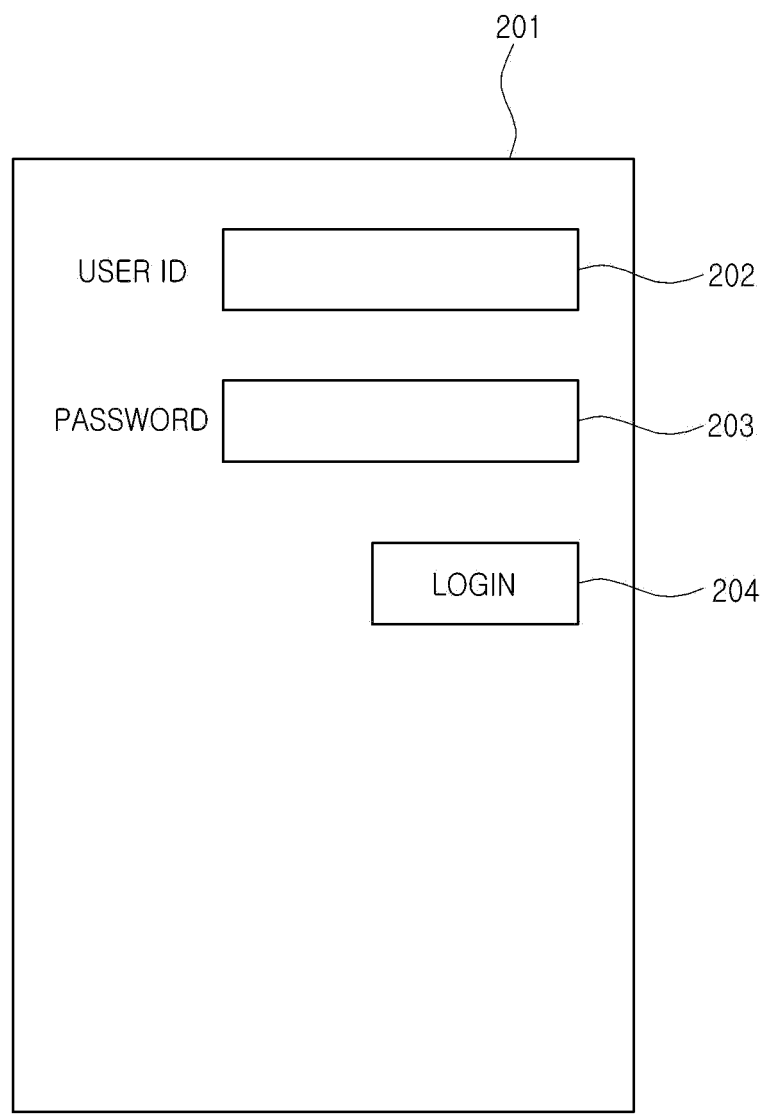
FIG. 2 is an example of an authentication screen for a game system according to exemplary embodiments of the present disclosure.

FIG. 2 is an example of an authentication screen 201 displayed on a display of the user terminal 103/104 for connecting the user terminal 103/104 to the server device 101 via the network 102 and logging in to the server device 101 by a user of the user terminal 103/104. The authentication screen 201 may be displayed when the user terminal 103/104 executes an application program corresponding to a game in response to a selection by the user of the user terminal 103/104, when a user of the user terminal 103/104 would like to access the server device 101 for playing a game. In some cases, when the application program is installed in the user terminal 103/104, authentication information of a user may be stored in the user terminal 103/104 after initially being provided by the user, so that the user does not have to login each time the user terminal 103/104 executes the application program.

A user of the user terminal 103/104 may operate an input device, such as a keyboard, mouse, or touch panel, in the user terminal 103/104, and may input his/her user identification (ID) into a text input area 202 of the authentication screen 201. The user may also input a corresponding password into a second text input area 203 and select the "LOGIN" button 204. The user terminal 103/104 may send authentication information including the input user ID and password to the server device 101 via the network 102. When the server device 101 receives the user ID and the password, the server device 101 may authenticate the authentication information received from the user terminal 103/104 using various suitable authentication methods. It should be understood that although a user ID and password are illustrated in FIG. 2, various other suitable authentication methods may be used. For example, in some cases, a Near Field Communication (NFC) or biological authentication data may be used for user authentication.

If the authentication is successful, the server device 101 may send screen data for a user to play a game (corresponding to the executed application program) to the user terminal 103/104. If authentication is not successful, screen data for a user to re-input a user ID and a password and screen data for displaying an error are sent from the server device 101 to the user terminal 103/104.

Screen data, such as data in the authentication screen 201, may be coded in HyperText Mark-up Language (HTML) or any other suitable programming language. For example, in some cases, a screen number of an application program operating in the user terminal 103/104 may be used as screen data.

Figure 3:
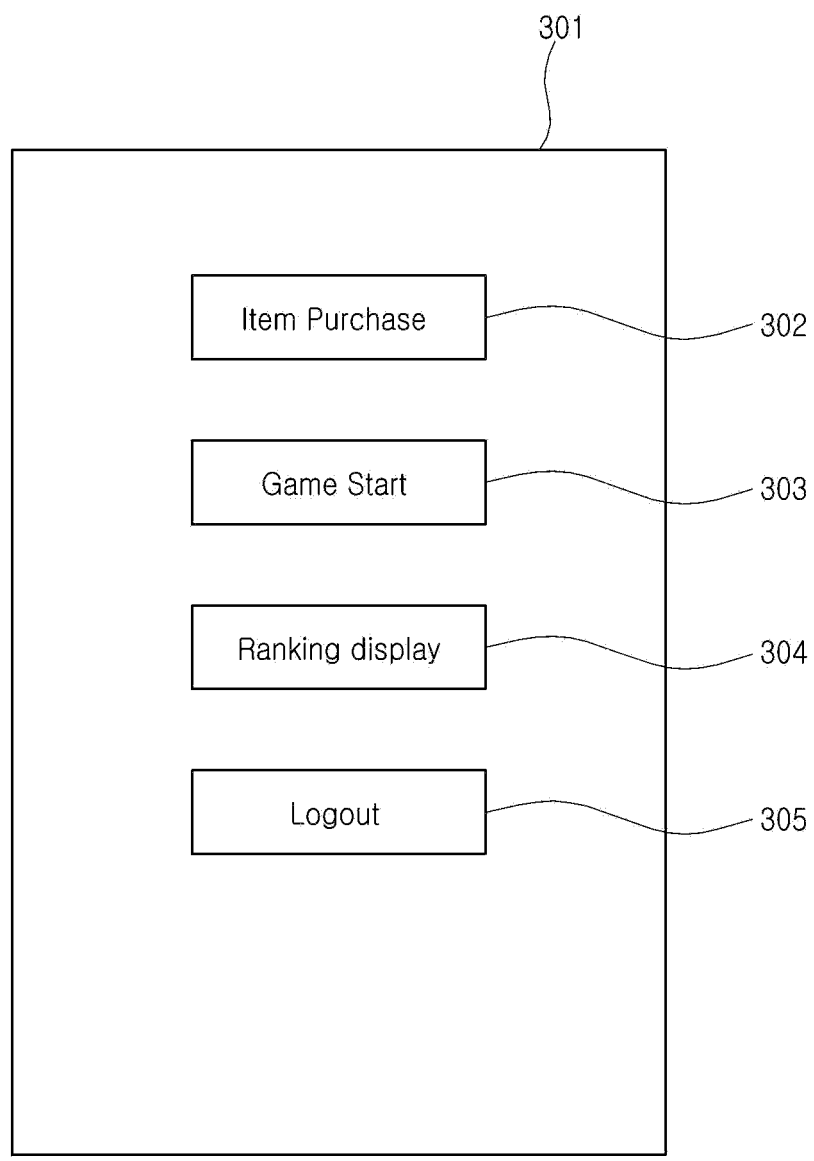
FIG. 3 is an example of a selection screen displayed on a user terminal after logging into a game system according to exemplary embodiments of the present disclosure.

FIG. 3 is an example of a screen 301 displayed in a display of the user terminal 103/104 after authentication is successful. For example, an "Item Purchase" button 302, "Game Start" button 303, "Ranking Display" button 304, and "Logout" button 305 may be displayed in screen 301. A user can select one of buttons 302, 303, 304, and 305.

The "Item Purchase" button 302 may be selected if the user would like to purchase or obtain an item to be used in a game initiated by selecting the "Game Start" button 303. The item may include, for example, a weapon used in the game, an accessory, or a card for increasing a player's ability. When "Item Purchase" button 302 is selected, the user may select an item to purchase in the same window, or, in some cases, a separate screen may be displayed and the user can specify or search for his/her desired item. The obtained item may be available for a charge or may be free. For example, in a case where points are awarded according to the results of a game accumulated by a user, it is possible to obtain an item by exchanging the points for the item without a payment of cash. In some cases, a new user who has just been registered in the server device 101 may obtain a card for free. The item selection of the user is sent to the server device 101, which monitors all the items obtained/purchased by a user of a game.

Figure 4:
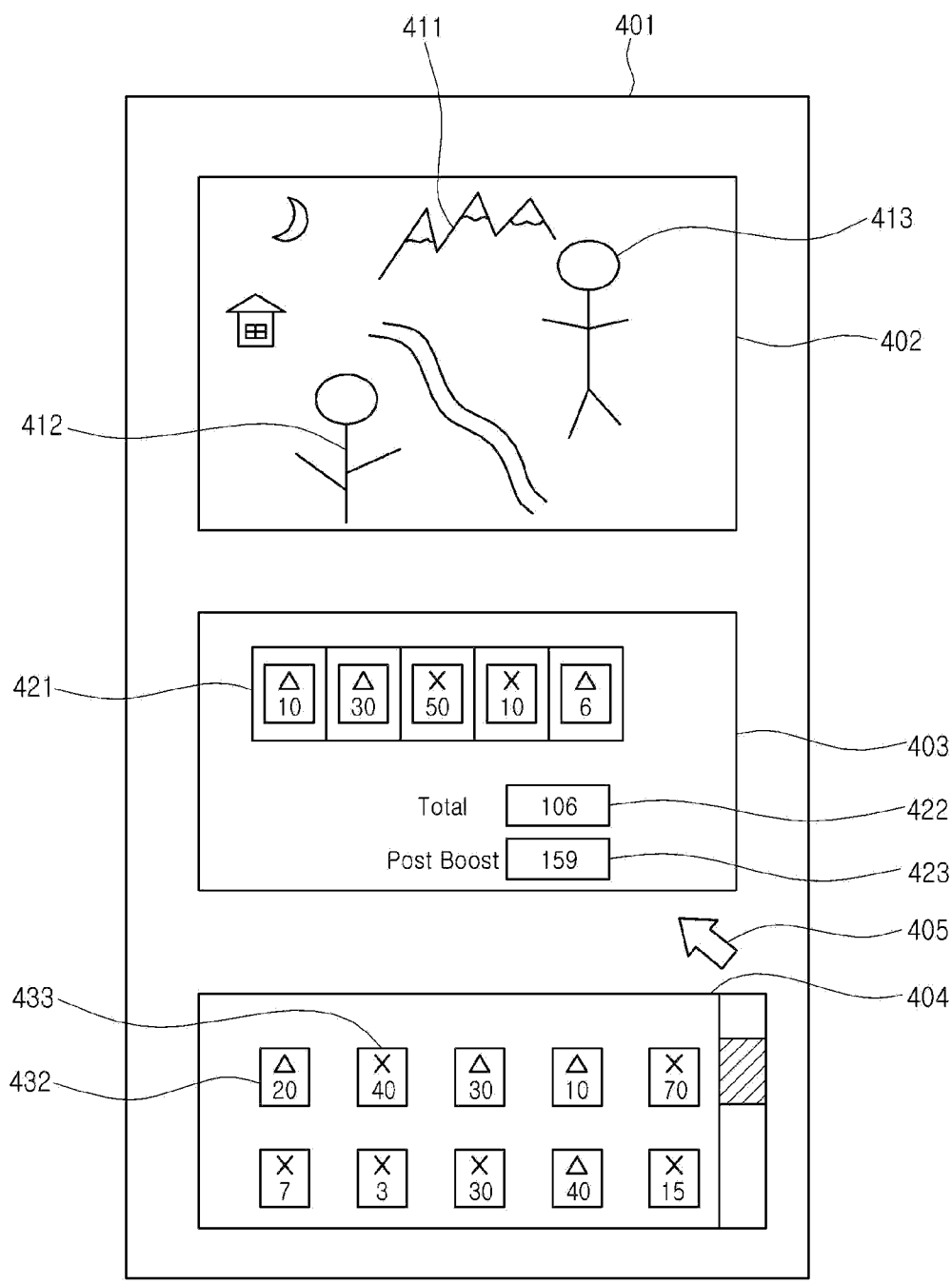
FIG. 4 is an example of a game screen displayed on a user terminal in a game system according to exemplary embodiments of the present disclosure.

When the "Game Start" button 303 is selected, a screen of a game, such as the screen shown in FIG. 4, is displayed, and a user of the user terminal 103/104 may execute a game provided by the server device 101. A game provided by the server device 101 will be described below as an example of a game with reference to FIG. 4.

When the user selects the "Ranking Display" button 304, the results of a game executed by selecting the "Game Start" button 303 may be shown. For example, after selection of the "Ranking Display" button 304, a list of IDs or handle names may be displayed to rank users and the scores of users who have played the game. The ranking of users may provide a greater interest in the game by the users.

The "Logout" button 305 may be selected by a user when the user wishes to terminate the user terminal 103/104's connection with server device 101. The "Logout" button 305 may be a button implemented via a browser or an application program operating in the user terminal 103/104.

FIG. 4 shows an example of a screen (i.e., game screen 401) displayed on a display of the user terminal 103/104 when the "Game Start" button 303 is selected and the game provided by the server device 101 is executed. The game screen 401 includes a match window 402, a deck window 403, and an item window 404.

A match opponent 412 corresponding to a user of the user terminal 103/104 and an opposing match opponent 413 may be displayed on a background image in the match window 402. The opposing match opponent 413 may be a match opponent corresponding to a user of another user terminal or may be a match opponent provided by the server device 101. While the game screen 401 shows only one opposing match opponent 413, exemplary embodiments of the disclosed subject matter are not limited thereto. In some cases, more than one opposing match opponent may play the game. Game screen 401 may also display a scenery image as a background image. The background image may be any suitable image including, for example, an image of nature, such as a distant mountain 411, or an image of a man-made structure, such as a building. In some cases, the background image may be a moving picture, such as a video.

When a user of the user terminal 103/104 operates an input device of the user terminal 103/104, it is possible to move the match opponent 412 and compete with the opposing match opponent 413. It should be understood that various suitable input devices may be used. For example, in some cases, the input device may be a stylus, a joystick, a user's finger, a mouse, a keyboard controller, or an optical device.

The deck window 403 may include an item arrangement area 421, a point total value display area 423, and a post boost total value area 423. An item may include a card, and each card may be assigned a value equivalent to, for example, points. When a card is displayed, points assigned to that card may also be displayed. Assigned points may indicate an ability value (e.g., attack ability or defence ability) of the match opponent 412 competing with an opposing match opponent 413. A number of cards may be arranged in the item arrangement area 421. For example, in FIG. 4, five cards are arranged in the item arrangement area 421. The ability value of the match opponent 412 may be determined based on a total value of points of the cards arranged in the item arrangement area 421.

A total value of points displayed on the cards in the item arrangement area 421 is displayed in the point total value display area 422. In this way, a user can easily be aware of the total value of his/her accumulated points The cards may be divided into at least two types. As an example, in FIG. 4, a triangle (Δ) and a cross (x) are displayed above the points displayed on a card to indicate the type of card. The total value of cards displayed with a triangle in the item arrangement area 421 may be referred to as a boost point total value. A total value of points for the user may be greater than the total value of points displayed on the cards arranged in the item arrangement area 421.

FIG. 5 shows an example of a table stored by the server device 101. A boost point total value and an increase ratio of the total point value of the cards arranged in the item arrangement area 421 may be correlated. For example, if the boost point total value is greater than or equal to 0 and less than 25, the total value of points for the cards arranged in the item arrangement area 421 is not increased. However, if the boost point total value is greater than or equal to 25 and less than 50, the total value of points for the cards arranged in the item arrangement area 421 is increased by 50%. If the boost point total value is greater than or equal to 50 and less than 75, the total value of points of the cards arranged in the item arrangement area 421 is increased by 100%. If the boost point total value is greater than or equal to 75 and less than 100, the total value of points of the cards arranged in the item arrangement area 421 is increased by 200%. If the boost point total value is greater than or equal to 100 and less than 125, the total value of points of the cards arranged in the item arrangement area 421 is increased by 400%. If the boost point total value is equal to or greater than 125 and less than 150, the total value of points of the cards arranged in the item arrangement area 421 is increased by 600%. If the boost point total value is 150 or more, the total value of points of the cards arranged in the item arrangement area 421 is increased by 1,000%. For example, if the total value of points of the cards arranged in the item arrangement area 421 is 100 and the boost point total value is greater than or equal to 25 and less than 50, the total value of points for the user is increased to 150. As shown in FIG. 4, if the total value of points of the cards is 106 and the boost point total value is 46, the total value of points for the user factoring in the boost point total value is 159.

As explained with respect to FIGS. 4 and 5, the total point value according to the assigned values displayed on the cards in the item arrangement area 421 is increased as the boost point total value increases. In some cases, a function for calculating increases in the total value of points according to the assigned values displayed on the cards in the item arrangement area 421 with respect to the boost point total value is an upward convex function.

By increasing the total value of points for a match opponent 412 according to a boost point total based on the value of an item (i.e., a card displayed with a triangle), a user may have an increased desire to purchase a new item (a new card).

In FIG. 4, the total value of points of the cards arranged in the item arrangement area 421 is 106, and the boost point total value of the cards displayed with a triangle is 46. Therefore, referring to FIG. 5, the total value of points for the user is increased by 50%. Consequently, 159 is displayed in subwindow 423, which shows a post boost value, that is, a total value of points for a user after factoring in the boost point total value. Although not shown, an area which displays the boost point total value may also be arranged on the game screen 401.

Item window 404 displays cards, such as a card 432 or a card 433, which are purchased or obtained by the user of the terminal 103/104. Cards in the item window 404 selected by the user using the input device are arranged in the item arrangement area 421. For example, a card displayed in the item window 404 may be dragged and dropped to the item arrangement area 421 using cursor 405. In addition, in some cases, the user may return a card arranged in the item arrangement area 421 to the item window 404.

Since a triangle is displayed on card 432, when the card 432 is moved to the item arrangement area 421, the card 432 is used to contribute to the boost point total value and the total value of points. Since a cross is displayed on card 433, when the card 433 is moved to the item arrangement area 421, a total value of points is increased by the value assigned to card 433. However, the card 433 is not used for calculating the boost point total value.

In some cases, a card used in calculating the boost point total (e.g., card with a triangle) may be available for a fixed period of time or according to a set of conditions, as set by the programmers of the game. For example, the card may be available for a fixed number of days or weeks, or may be contingent upon achieving certain results in the game. The card used in calculating the boost point total may be more difficult to obtain than other types of cards. For example, conditions for making such a card difficult to obtain may include obtaining match results of a game better than results of other users, playing a game with a specific match opponent, or joining to a particular event. In addition, the card used in calculating a boost point total value may be obtainable by a user from the server device 101.

A user may continue to purchase or obtain cards with the aim of purchasing or obtaining a card used in calculating a boost point total value. In addition, it is possible to maintain the desire of a user to be successful in a game because it is possible to obtain a card used in calculating a boost point total value when the user plays a game and wins against a match opponent.

Although FIG. 4 illustrates two types of cards, it should be appreciated that various types of cards may be provided in the game. The cards may be designated by marks other than the triangle (Δ) and the cross (x) to differentiate these cards from cards with the triangle (Δ) and the cross (x). The cards with designated marks other than the triangle (Δ) and the cross (x) may have different assigned values, and may, in some cases, contribute to the boost point total value according to an increase ratio that is different than the ratios shown in FIG. 5. For example, a third type of card may increase a point total value for the cards arranged in the item arrangement area 421 by 75% when the total value of the third type of cards is greater than or equal to 25 but less than 50.

Figure 6:
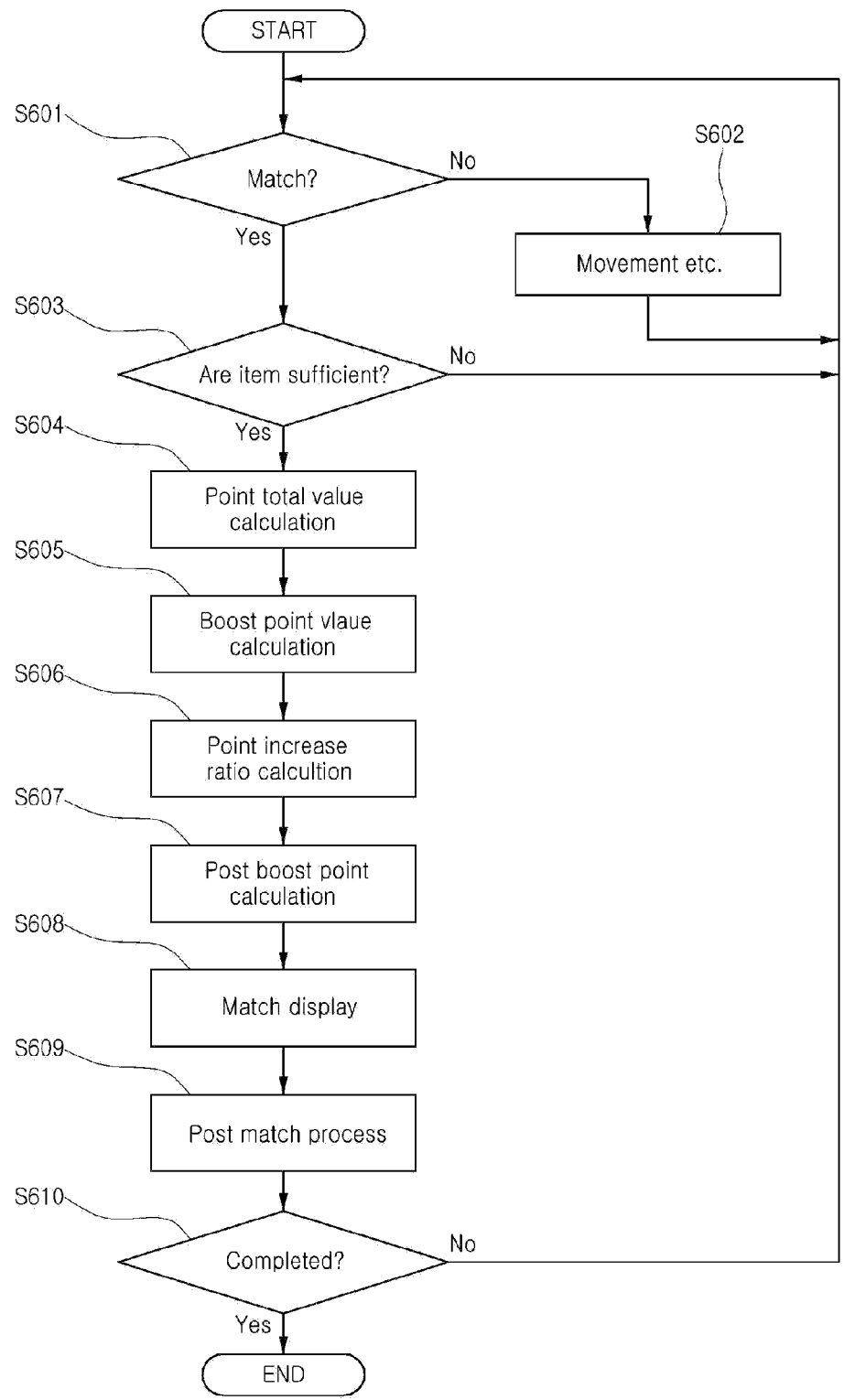
FIG. 6 is an illustration of a game method after the "Game Start" button 303 in FIG. 3 is selected, according to exemplary embodiments of the disclosed subject matter.

FIG. 6 is a flowchart illustrating a game method after the "Game Start" button 303 is selected, according to exemplary embodiments of the disclosed subject matter. The game method may be executed by server device 101. The server device 101 may determine whether a match has started or not (S601). A match is determined to have started when an opposing match opponent 413 is displayed in the match window 402 and a specific operation is performed by the user using an input device.

When a match is determined not to have started, an operation to move the match opponent 412 corresponding to the user may be performed, and/or an item may be moved from the item window 404 to the item arrangement area 421 (S602). Subsequently, the method returns to S601.

When a match is determined to have started, the server device 101 determines whether sufficient items are arranged in the item arrangement area 421 (S603). For example, if no cards are arranged in the item arrangement area 421 and if the total value of points is 0, the method returns to S601. In some cases, items arranged in the item arrangement area 421 may be determined to be sufficient if one or more cards are arranged in the item arrangement area 421.

When the server device 101 determines that sufficient items are arranged in the item arrangement area 421, the server device 101 calculates the total value of points of cards arranged in the item arrangement area 421 (S604).

Next, the server device 101 calculates a boost point value (S605). For example, as described above, points displayed on cards with a triangle may be used to calculate the boost point value.

The server device 101 determines a point increase ratio (S606). As described above with respect to FIGS. 4 and 5, the point increase ratio is calculated with respect to the total points displayed on one or more cards in the item arrangement area 421 having corresponding boost point values (e.g., displayed with a triangle).

The server device 101 then determines post boost points (S607). For example, as explained above, the total value of points calculated in S604 is increased by the point increase ratio calculated in S606.

Next, the server device 101 instructs the user terminal 103/104 to display the match in a game screen 401 (S608). A screen display may change when the user operates the user terminal 103/104. In some cases, it is possible to perform an automatic match display as follows. For example, the post boost points (i.e., total value of points of a user) calculated in S607 and the points held by an opposing match opponent 413 are compared. If the number of post boost points is larger than the number of points held by an opposing match opponent 413, a visual message, such as a video, indicating that the user has beaten a match opponent is sent to the user terminal 103/104. If the number of post boost points is smaller than the number of points held by an opposing match opponent 413, a visual message indicating that the user has lost to an opposing match opponent 413 is sent to the user terminal 103/104. In some cases, if the number of post boost points is the same as the number of points held by an opposing match opponent 413, a visual message indicating a draw is sent to the user terminal 103/104 by the server device 101.

It is not necessary for the visual message to be prepared in advance. For example, it is possible to prepare a number of patterns according to a break in a match opponent's actions and to generate a visual message when the match is being played.

When sending a visual message with respect to a match, it is possible to send a video having a length according to the difference in the number of post boost points calculated in S607 and the number of points held by an opposing match opponent 413. For example, if the difference in the number of post boost points and the number of points held by an opposing match opponent 413 is large, it is possible to send a video in which a win or a loss is determined in a shorter period of time. If the difference in the number of post boost points and the number of points held by an opposing match opponent 413 is small, it is possible to send a video in which a win or a loss is not determined unless a longer period of time has elapsed. In this way, it is possible to draw out the interest of a user in a win or loss. In addition, it is possible to allow a user who wishes to experience a win or a loss multiple times in a short period of time to use up many points. Furthermore, it is possible to adapt this to the desire of a user who enjoys a long game with few points.

When a match is finished, a match completion process (a post match process) is performed (S609). For example, in the match completion process, the item arrangement area 421 may be cleared and the game may proceed to the next level.

Next, the server device 101 determines whether to end the game (S610). If the server device 101 determines not to end the game, the game method returns to S601.

Figure 7A:
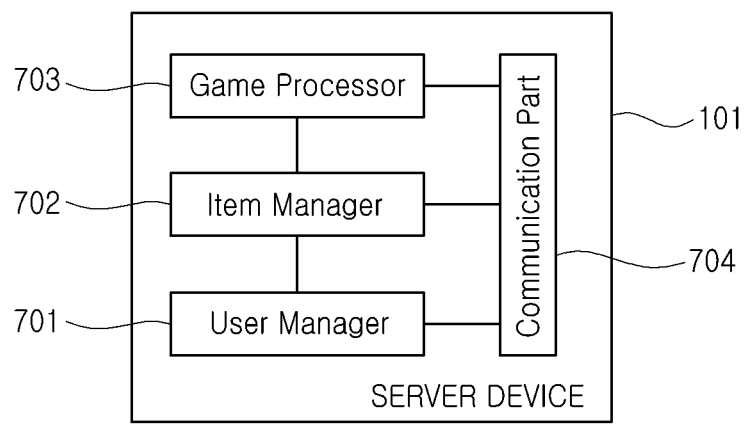
FIG. 7A is a functional block diagram of a server device in a game system according to exemplary embodiments of the present disclosure.

FIG. 7A shows a functional block diagram of the server device 101 according to exemplary embodiments of the present disclosure. The server device 101 may include a user manager 701, an item manager 702, a game processor 703, and a communication port 704.

The user manager 701 may manage user information related to one or more users of user terminals 103/104. The user information may include a user ID and a password of each user. The user manager 701 may include a storage unit, such as a memory, for storing the user information or may be connected to the storage unit. In addition, the user manager 701 may store a history of a user's results, and other information such as scores and highest scores.

The item manager 702 may include a storage unit, such as a memory, or may be connected to the storage unit, to store data related to an item held by each user. For example, points and a type of a card obtained by a user may be stored. In addition, the item manager 702 may perform processes when a user newly purchases or obtains an item. For example, the item manager 702 may determine which items are to be placed in the item arrangement area 421 and which items are to be placed in the item window 404. The item manager 702 may also manage the assignment of points for each item or card.

The game processor 703 executes one or more functions of the game. For example, the method of FIG. 6 is performed by the game processor 703. The game processor 703 may also execute one or more computer programs or instructions in one or more computer-readable mediums to implement various exemplary embodiments of the disclosed subject matter. These computer programs may be written in any type of computer programming language, including a procedural programming language, object-oriented programming language, macro language, or combination thereof. These computer programs may be stored in a storage system, which may hold information on a volatile or non-volatile medium, and may be fixed or removable.

The communication port 704 may perform communications with the user terminals 103 and 104. For example, data may be received from the user terminals 103 and 104 via the communication port, and transmitted to the user manager 701, the item manager 702, and/or the game processor 703. In addition, the communication port 704 may transmit data generated by the user manager 701, the item manager 702, and the game processor 703 to the user terminals 103 and/or 104. The communication port 704 may include a transceiver for receiving and sending data from and to the user terminals 103 and 104.

Figure 7B:
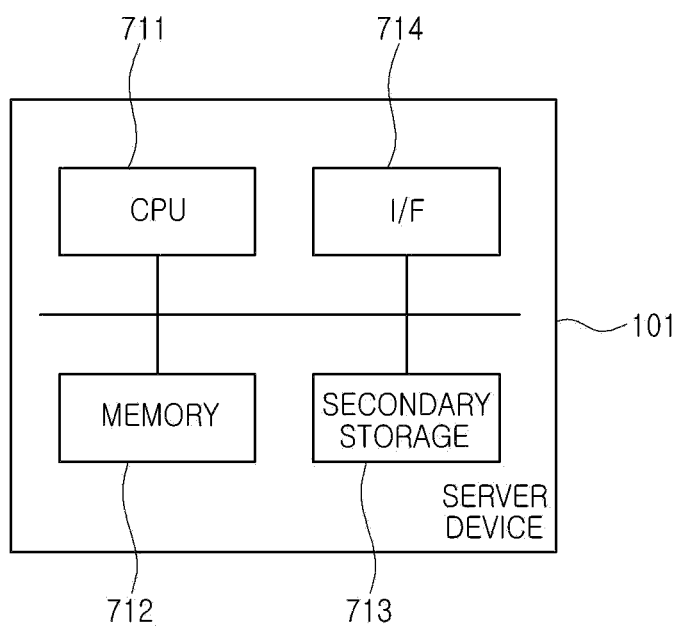
FIG. 7B is a functional block diagram of a server device in a game system according to exemplary embodiments of the present disclosure.

FIG. 7B shows an example of a physical structure of the server device 101. The server device 101 may include a central processing unit (CPU) 711, a memory 712, a secondary storage 713, and an interface (I/F) 714. The CPU 711 may execute a program in the server device 101 and may use the memory 712 as an operational area. The program may perform processes associated with the user manager 701, the item manager 702, and the game processor 703, as described above. The memory 712 may function as an operational area when the program is executed, and may be a temporary storage location of data. The secondary storage 713 may continuously store data. For example, when a program is executed by the CPU 711, data related to a user ID, a password, an item held by a user, and contents, such as a visual message, sent to the user terminal 103 or 104 may be stored in the secondary storage 713. It should be appreciated that various suitable types of memories, such as hard disks and memory drives, may be used as the memory 712 and the secondary storage 713. The I/F 714 may perform communication with user terminals 103 and 104, and may correspond to the communication port 704. In some cases, the central processing unit (CPU) 711 may include the game processor 703.

FIG. 8 is a sequence diagram which shows communication between a user terminal 103 or 104 and a server device 101 in the game system according to exemplary embodiments of the disclosed subject matter.

The sequence begins with a user terminal 103/104 receiving login information via a screen 201, as shown in FIG. 2, from the user. The login information is sent to the server device 101 from the user terminal 103/104 (S801). If the server device 101 successfully authenticates the login information, data of a selection screen 301, as shown in FIG. 3, is sent to the user terminal 103/104 by the server device 101 (S802). After receiving the data of the selection screen 301 and after a user of the user terminal 103/104 selects the "Game Start" button 303, selection data showing that the "Game Start" button 303 has been selected is sent from the user terminal 103/104 to the server device 101 (S803).

Next, the server device 101 may send item data, which is data related to an item held by a user of the user terminal 103/104, to the user terminal 103/104 from the server device 101 (S804). After receiving the item data, an item window 404, as shown in FIG. 4, can be displayed in the user terminal 103/104.

The user terminal 103/104 may then transmit movement data, such as a movement direction of a match opponent 412, to the server device 101 (S805). Further, item selection data, which is data related to an item moved to the item arrangement area 421, may be sent from the user terminal 103/104 to the server device 101 (S806). S805 and S806 may be repeated as many times as needed according to the user's actions.

When a match starts, content, such as a visual message or a match result, may be sent from the server device 101 to the user terminal 103/104 in the form of match data (S807 and S808).

When the match is concluded, completion data, which indicates that a game has ended, is sent from the user terminal 103/104 to the server device 101 (S809). Next, selection screen data is sent from the server device 101 to the user terminal 103/104 (S810). When the "LOGOUT" button 305 is selected by the user of the user terminal 103/104, logout data is sent from the user terminal 103/104 to the server device 101 (S810). In this way, a series of communications between a user terminal and a server device for a user to play a game is completed. It should be understood that, in some cases, a user may not have to login and may play the game as a guest without providing login information.

As can be appreciated from the foregoing, according to the present disclosure, it is possible to provide a game system which can maintain the desire of a player for obtaining a new item, such as a card.

It should be appreciated that exemplary embodiments of the disclosed subject matter are also directed to a computer-readable medium encoded with one or more programs including instructions that, when executed on one or more computers or other processors, perform methods that implement the various exemplary embodiments of the disclosed subject matter. The computer-readable media may include, but are not limited to, non-transitory media, and volatile and non-volatile memory. The computer-readable media may include storage media, such as, for example, read-only memory (ROM), random access memory (RAM), floppy disk, hard disk, optical reading media (e.g., compact disc-read-only memory (CD-ROM), digital versatile discs (DVDs), hybrid magnetic optical disks, organic disks, flash memory drives or any other volatile or non-volatile memory, and other semiconductor media. In some cases, the computer-readable media may be electronic media, electromagnetic media, infrared, or other communication media. Also, the computer-readable storage media can store and execute computer-readable codes that are distributed in computers connected via a network. The computer-readable media also includes cooperating or interconnected computer-readable media that are in the processing system or are distributed among multiple processing systems that maybe local or remote to the processing system. The computer-readable medium or media can be transportable, such that the program or programs stored thereon can be loaded onto one or more different computers or other processors to implement various aspects of the disclosed subject matter.

It will be apparent to those skilled in the art that various modifications and variations can be made in the present disclosure without departing from the spirit or scope of the disclosed subject matter. Thus, it is intended that the present disclosure cover the modifications and variations of the disclosed subject matter provided they come within the scope of the appended claims and their equivalents.

What is claimed is:

1. A server device, comprising:
   at least one terminal executing a game;
   a communication port to communicate with the at least one terminal;
   an item manager to manage points associated with at least one user-obtained item, and to determine a placement of each user-obtained item in at least a first item arrangement area or a second item arrangement area in response to a user's selection received from the at least one terminal; and
   a processor to determine a first total value of points of the at least one user-obtained item, to determine a second total value of points for increasing the first total value, to increase the first total value according to the second total value, and to determine a winner of a game based on the increased first total value of the user and an opponent,
   wherein:
   the first total value of points comprises a sum of points assigned to at least one of a first type of item and a second type of item in the at least one user-obtained item;
   the second total value of points comprises the sum of points assigned to the first type of item;
   the increased first total value of points comprises a sum of the first total value of points and a factor of the first total value of points, the factor being varied according to the second total value of points; and
   the first type of item and the second type of item are obtainable by the user from a purchase or winning the game.

2. The server device of claim 1, wherein an increase ratio of the first total value is directly proportional to the second total value.

3. The server device of claim 1, wherein the processor is configured to determine an increase ratio of the first total value according to the second total value based on an upward convex function.

4. The server device of claim 1, wherein the at least one user-obtained item is provided for a limited time period.

5. The server device of claim 1, wherein the first total value corresponds to an ability of a user in the game.

6. A method for determining a winner of a game executed in at least one terminal communicating with a game server, comprising:
   receiving a user's selection from the at least one terminal via a communication port; and
   setting each user-obtained item in at least a first item arrangement area or a second item arrangement area in response to the user's selection;
   determining, by a processor, a first total value of points of at least one user-obtained item;
   determining a second total value of points;
   increasing the first total value according to the second total value; and
   determining the winner of the game based on the increased first total value of the user and an opponent,
   wherein:
   the first total value of points comprises a sum of points assigned to at least one of a first type of item and a second type of item in the at least one user-obtained item;
   the second total value of points comprises the sum of points assigned to the first type of item;
   the increased first total value of points comprises a sum of the first total value of points and a factor of the first total value of points, the factor being varied according to the second total value of points; and
   the first type of item and the second type of item are obtainable by the user from a purchase or winning the game.

7. The method of claim 6, wherein an increase ratio of the first total value is directly proportional to the second total value.

8. The method of claim 6, wherein an increase ratio of the first total value according to the second total value is calculated based on an upward convex function.

9. The method of claim 6, further comprising providing the at least one user-obtained item for a limited time period.

10. The method of claim 6, wherein the first total value corresponds to an ability of a user in the game.

11. One or more non-transitory computer-readable storage media having stored thereon a computer program that, when executed by at least one processor, causes the at least one processor to:
   determine a first total value of points of at least one user-obtained item;
   determine a second total value of points;
   increase the first total value according to the second total value; and
   determine a winner of a game based at least on the increased first total value of a user and an opponent,
   wherein:
   the first total value of points comprises a sum of points assigned to at least one of a first type of item and a second type of item in the at least one user-obtained item;
   the second total value of points comprises the sum of points assigned to the first type of item;
   the increased first total value of points comprises a sum of the first total value of points and a factor of the first total value of points, the factor being varied according to the second total value of points; and the first type of item and the second type of item are obtainable by the user from a purchase or winning the game.

12. The one or more non-transitory computer-readable storage media of claim 11, wherein an increase ratio of the first total value is directly proportional to the second total value.

* * * * *